United States Patent
Hillier (10) Patent No.: US 8,903,072 B2
(45) Date of Patent: Dec. 2, 2014

(54) CALL WAITING NETWORK IDENTIFICATION

(75) Inventor: Peter Matthew Hillier, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 13/407,613

(22) Filed: Feb. 28, 2012

(65) Prior Publication Data

US 2013/0223607 A1 Aug. 29, 2013

(51) Int. Cl.
*H04M 7/00* (2006.01)

(52) U.S. Cl.
USPC .................................................. 379/215.01

(58) Field of Classification Search
USPC ............................ 379/142.08, 215.01, 207.16
See application file for complete search history.

(56) References Cited

U.S. PATENT DOCUMENTS

| | | | |
|---|---|---|---|
| 6,011,909 A * | 1/2000 | Newlin et al. ................. | 709/227 |
| 6,876,632 B1 | 4/2005 | Takeda | |
| 7,418,091 B1 * | 8/2008 | Sylvain .................... | 379/215.01 |
| 2006/0245560 A1 * | 11/2006 | Jeng .......................... | 379/88.19 |
| 2008/0056208 A1 * | 3/2008 | Hinrikus et al. .............. | 370/338 |
| 2008/0092149 A1 * | 4/2008 | Rowbotham et al. ......... | 719/321 |

* cited by examiner

*Primary Examiner* — Nafiz E Hoque (57) ABSTRACT

A multi-mode device for providing call waiting network identification. The device can establish a first call through a first network. While communicating through the first network, a second call can be received from a second network. The first network can be independent of the second network and operate separately on the multi-mode device. The multi-mode device can inject an alert specific to the second network into the call through the first network signaling the call through the second network. By providing the alert, the user of the multi-mode device can determine if the call waiting tone is for business or personal giving the user the chance to ignore the call and continue talking without having to take the handset away from their face, activate the screen and view the caller identification information to decide whether or not to take the call.

20 Claims, 5 Drawing Sheets

//CALL WAITING NETWORK IDENTIFICATION

TECHNICAL FIELD

This disclosure generally relates to electronic devices, and more particularly, to a multi-mode device with multiple network connectivity capabilities that provides a call waiting alert based on the specific network a call is coming from.

BACKGROUND

A "Dual-Mode" or "Multi-Mode" device can be an electronic device that can connect with multiple networks. By way of a non-limiting example, the electronic device can connect with a wireless carrier and a Wi-Fi network for placing or receiving calls. Multi-mode devices can share components within them. Beyond the hardware challenges, there are also several software integration challenges when multiple networks are placing calls for the device. This leads to real difficulties in component integration and so to larger and more complex phones typical in today's market.

In "Bring Your Own Device" (BYOD) scenarios, it can be practical and common that a mobile user be active on both a mobile and Wi-Fi network simultaneously. As an illustration, suppose that if a user has their own personal device which they are using for work purposes, they can still wish to get their personal calls through a mobile network, while at the same time getting their work calls through a Private Branch Exchange (PBX) Wi-Fi network. In dual or multi mode scenarios, the device must deal with call collisions. It can be important for the user to understand which network the call is arriving from, in order to determine whether or not to interrupt the ongoing call.

In contrast to fixed phones, on mobile devices, the handset must be removed from the ear to view the caller identification to determine whether or not the call can be important. This can interrupt the communication. Knowing beforehand whether or not it is a business or personal call can prevent this interruption. When the caller identification is not provided by the network, for example the owner of the personal device has not opted to pay for this feature, it is impossible to determine who is calling. If the business line supports caller identification, the user can know that they can look at their device to see who is calling. If the call is from the mobile network, the user has no way to see who is calling.

A need therefore exists for a call waiting network identification that overcomes those issues described above. The network specific call waiting indication should provide advanced notice to the multi-mode device user which network the call is originating from. This context can allow the user to decide whether or not to interrupt the ongoing call, or whether or not additional information, for example caller identification, can be available to aid in the decision to interrupt the call. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to communications, and more particularly, to a call waiting network identification. In an illustrative embodiment, a multi-mode device is provided. The device can establish a first call through a personal carrier network. While communicating through the personal carrier network, a second call can be received from a Wi-Fi network through a Private Branch Exchange (PBX). The personal carrier network can be independent of the Wi-Fi network and operate separately on the device. The device can inject an alert specific to the Wi-Fi network into the call from the personal carrier network signifying the call through the Wi-Fi network. Through this, the device bridges both the personal carrier network and Wi-Fi network and appropriately identifies the Wi-Fi network to the user. In turn, the alert can act as advance notice that a caller identification is available for Wi-Fi business calls even when the user does not pay for this service on their personal carrier network.

Numerous advantages can be offered by the illustrative embodiment described above. By providing the alert, the user of the multi-mode device can determine if the call waiting tone is for business or personal reasons giving the user the chance to ignore the call and continue talking without having to take the handset away from their face, activate the screen and view the caller identification information to decide whether or not to take the call. Furthermore, current systems allowing multi-mode features would not be able to handle both of the calls from the personal carrier network and Wi-Fi network and in some instances, the second call coming from the Wi-Fi network would be sent directly to voicemail or dropped. Many additional advantages of the present disclosure will become apparent to those skilled in the relevant art as provided for in the following description.

Figure 1:
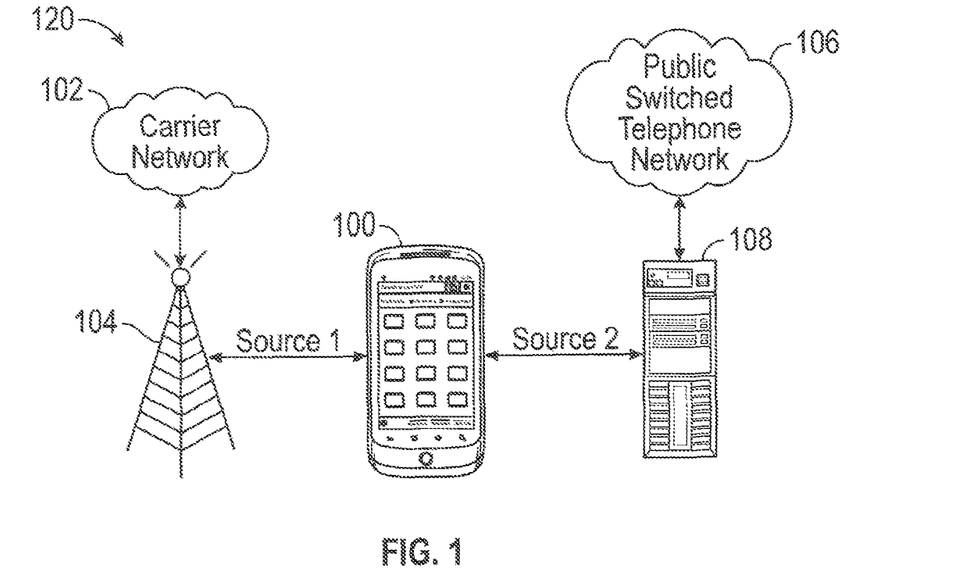
FIG. 1 is a block diagram illustrating an exemplary environment for a multi-mode device in communication with multiple network sources in accordance with one or more aspects of the present disclosure.
Figure 2:
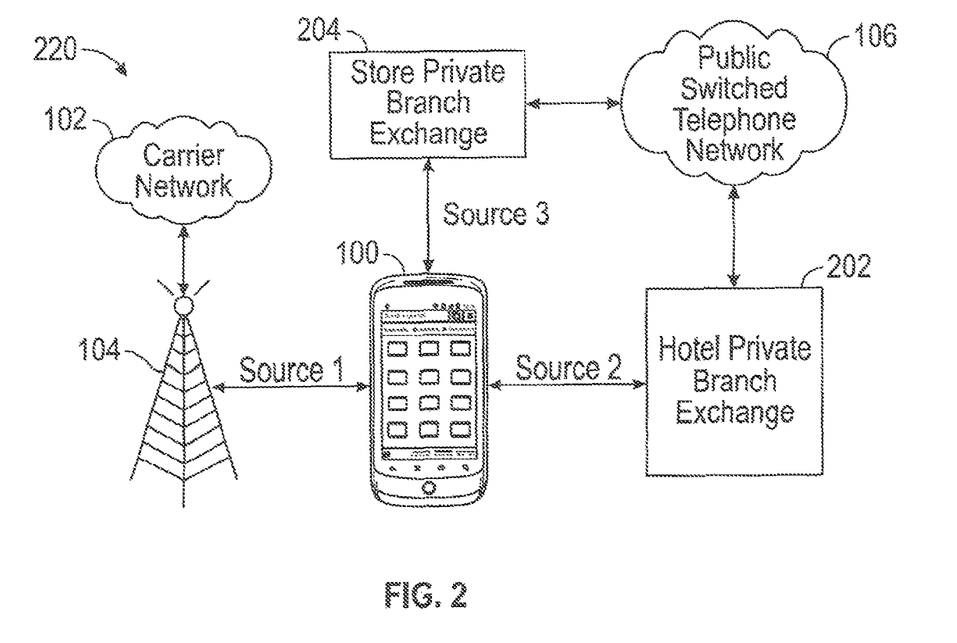
FIG. 2 is a block diagram illustrating another exemplary environment for the multi-mode device connected to a variety of network sources in accordance with one or more aspects of the present disclosure.
Figure 3:
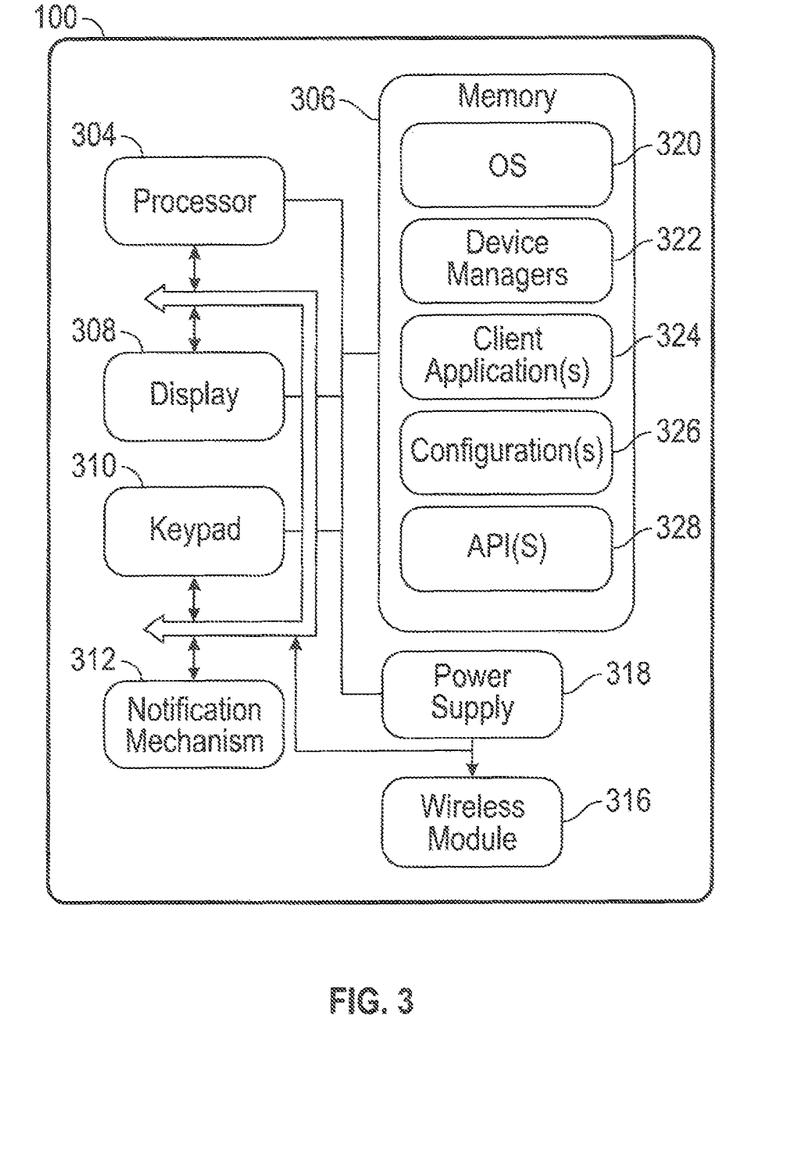
FIG. 3 is a block diagram illustrating typical components of the multi-mode device in accordance with one or more aspects of the present disclosure.
Figure 4:
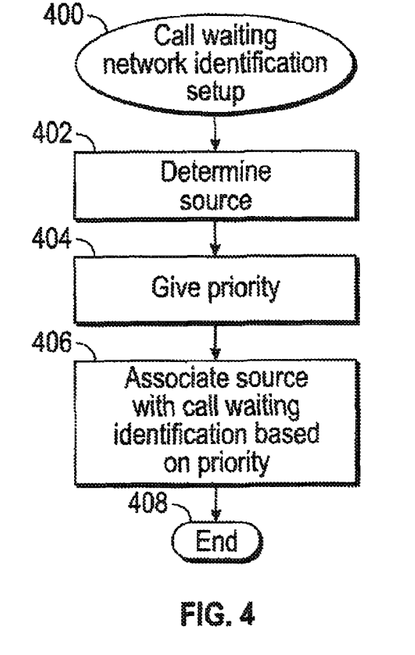
FIG. 4 is a flow chart depicting illustrative processes for call waiting network identification setup in accordance with one or more aspects of the present disclosure.
Figure 5:
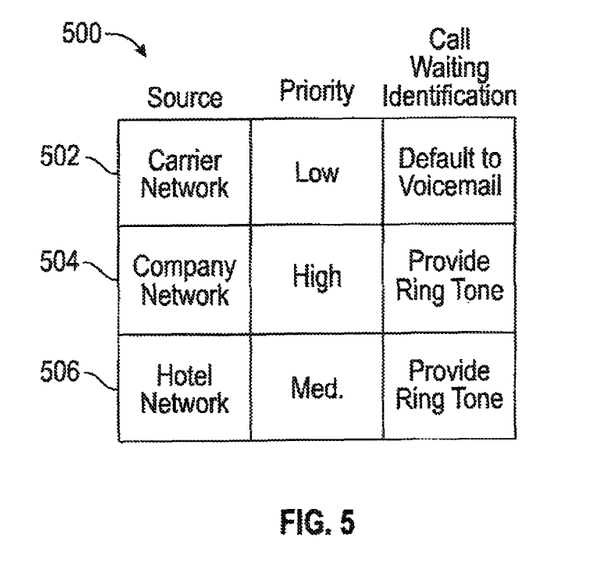
FIG. 5 is a table showing possible priorities for network sources in accordance with one or more aspects of the present disclosure.
Figure 6:
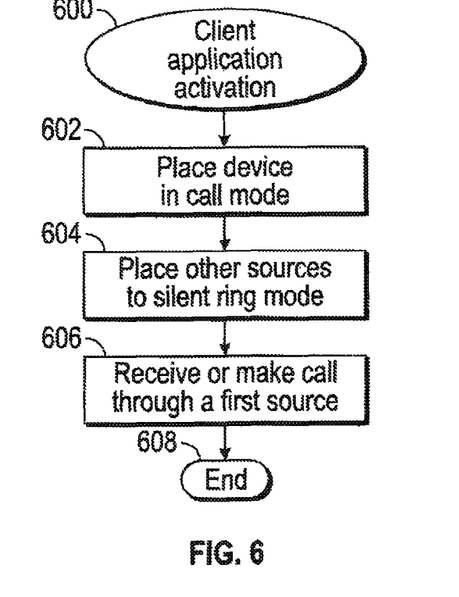
FIG. 6 is a flow chart depicting illustrative processes for client application activation in accordance with one or more aspects of the present disclosure.
Figure 7:
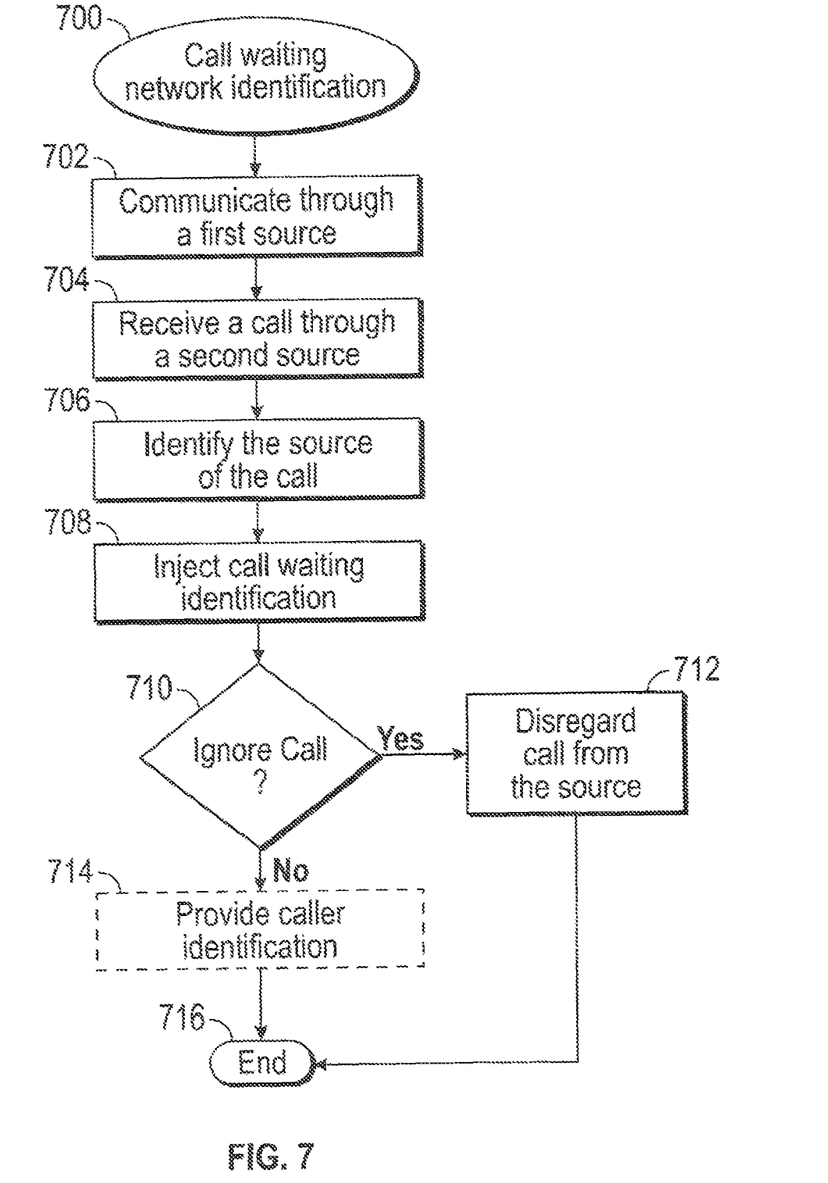
FIG. 7 is a flow chart depicting illustrative processes for call waiting network identification in accordance with one or more aspects of the present disclosure.
Figure 8:
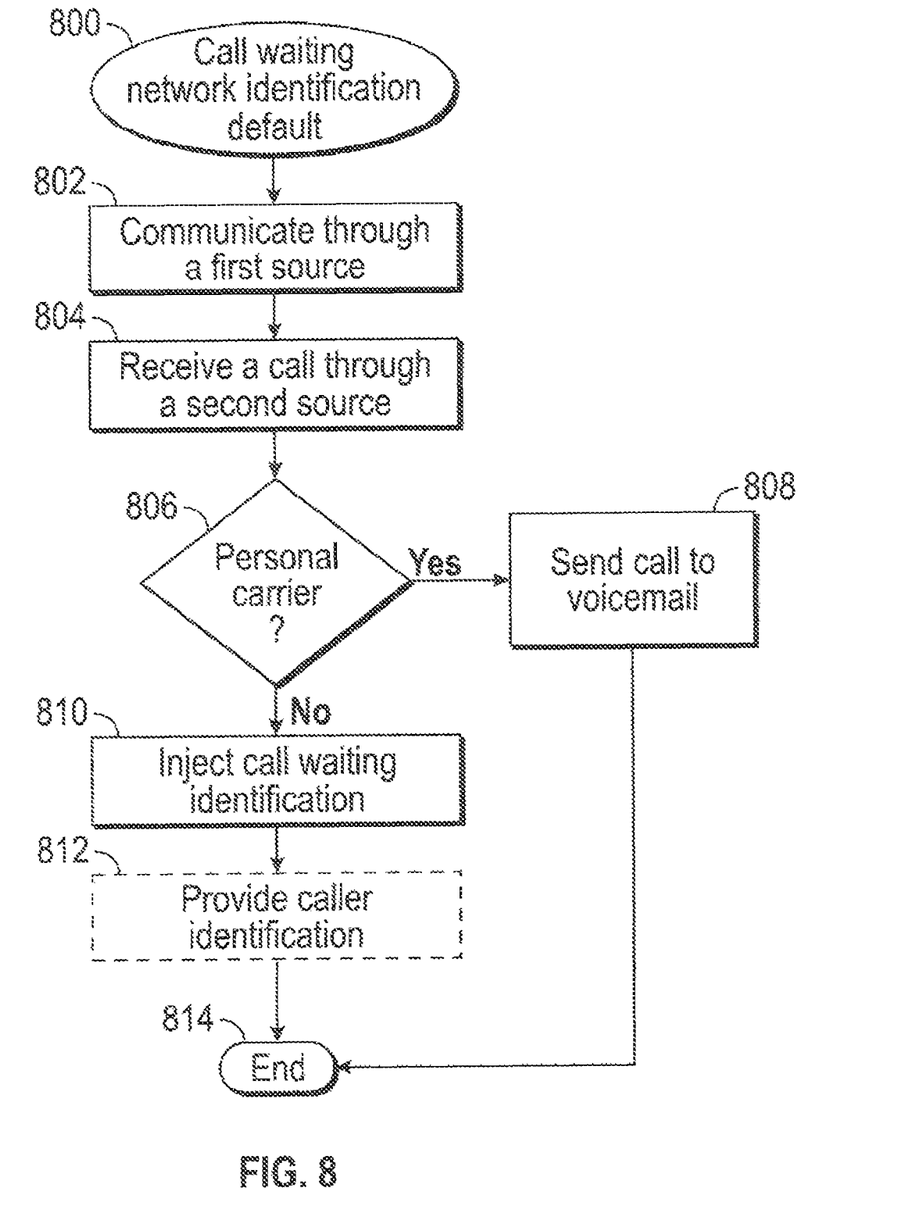
FIG. 8 is a flow chart depicting illustrative processes for call waiting network identification default in accordance with one or more aspects of the present disclosure.

Exemplary environments for providing call waiting network identification will be shown in FIGS. 1 and 2. FIG. 3 depicts exemplary hardware and software features of a multi-mode device. FIGS. 4 through 6 will show setup and activation of the device, while FIGS. 7 and 8 depict exemplary processes for call waiting network identification. These FIGURES are not intended to be limiting, but rather provided to disclose features and concepts herein.

Referring to FIG. 1, a block diagram illustrating an exemplary environment 120 for a device 100 in communication with multiple network sources in accordance with one or more aspects of the present disclosure is provided. The device 100 can allow for both carrier and Wi-Fi calls simultaneously, as shown. With the carrier network 102, the device 100 can make or receive carrier calls using a first source. These carrier calls can be transmitted between a cell tower 104 and to the carrier network 102. The carrier network 102 can also communicate to the device 100 through other techniques including direct satellite feed.

Through a second source, the multi-mode device 100 can communicate with a PBX 108 to interact with a Wi-Fi network. The PBX 108 can provide Wi-Fi through a Wireless Access Point (WAP). Data can be exchanged, or a call can be made through, with the PBX 108. The PBX 108 can be connected to a Public Switched Telephone Network (PSTN).

By connecting with multiple networks 102 and 106, unique calling scenarios can be implemented by the multi-mode device 100. If a user is on a carrier call through the carrier network 102 and a Wi-Fi call arrives to their device 100 through the PBX 108 connected to the PSTN 106, the Wi-Fi call waiting in previous implementations is not triggered. Similarly, if the user is on a Wi-Fi call and a carrier call arrives at the device 100, the PBX 108 cannot play call waiting tones signaling the receipt of the carrier call. These challenges are due to the fact that call waiting is typically injected by the network provider. This is true on multi-mode devices 100 where call waiting is a feature that is commonly charged for in the form of a monthly fee. Issues arise when the caller is on a carrier call and the PBX 108 has no knowledge the device 100 is in use. Likewise, when the device 100 is on a PBX call, the carrier will believe the device 100 is not in a call and will present an incoming call normally.

In one embodiment, the service provider can be capable of injecting a call waiting tone into the voice path of the device 100. This can be true for mobile operators and PBX vendors. This can be a "feature" that can be enabled based on licensing or a service fee. If the device 100 is capable of supporting more than one call simultaneously, the device 100 can insert call waiting tones to alert the user of the additional call. A different tone for each caller can be provided. The point of call waiting, however, is to minimally disrupt the ongoing voice call, so using this to uniquely identify the caller has limitations.

FIG. 2 is a block diagram illustrating another exemplary environment 220 for the multi-mode device 100 connected to a variety of network sources in accordance with one or more aspects of the present disclosure. The device 100 can be connected to more than two sources. As shown, the device 100 can be connected to a carrier network 102 through a cell tower 104. A hotel PBX 202 can provide a second source for placing or receiving a call, while a store PBX 204 can also be provided. Both PBXs 202 and 204 can be connected to a PSTN 106. The multi-mode device 100 can receive calls from these sources.

For purposes of illustration, the user of the device 100 can be on a phone call through the carrier network 102. During that call, another call can be received from the hotel concierge through the hotel PBX 202 indicating that the user has received a free promotional spa package. The store at which the user had a suit tailored can also call the user to tell them that their suit is finished. Based on this scenario, more than two networks can be communicated with to receive calls each having a different priority. Priorities can be set for each of these networks as well as a unique call waiting network identification.

Those illustrations described above represented a set of networks that the multi-mode device 100 can work with. Call waiting network identification can be performed across multiple network types. These can include, but are not limited to, 2G/3G/4G Long Term Evolution (LTE), private Global System for Mobile Communications (GSM), Wi-Fi, Bluetooth® and Near Field Communications (NFC). As will be shown below, the device 100 can coordinate collisions by adding in call waiting alerts on the end device 100, and more specifically providing a specific pattern through a tone and/or vibration to signal which network the incoming communication is on.

Turning to FIG. 3, a block diagram illustrating typical components of the multi-mode device 100 in accordance with one or more aspects of the present disclosure is provided. The hardware and software components of a typical device 100 for receiving call waiting network identification will now be shown. In typical embodiments, the device 100 can have a processor 304 for implementing logic, a memory 306, a display 308 and a keypad 310. The display 308 of the device 100 can be a liquid crystal display (LCD), or any other type of display commonly used in device 100. The display 308 can be touch-sensitive, and can act as an input device. The keypad 310 can be a push button numeric dialing pad (such as on a typical telephone), a multi-key keyboard (such as a conventional keyboard), or any other device for inputting textual data.

The memory 306 generally includes both volatile memory (e.g., RAM) and non-volatile memory (e.g., ROM, Flash Memory, or the like). The non-volatile portion of the memory 306 can be used to store persistent information which should not be lost when the device 100 is powered down. The device 100 can include an operating system (OS) 320, such as Windows CE® or Windows Mobile® available from Microsoft Corporation, Android™ from Google Inc., or other OS. The OS can reside in the memory 306 and be executed on the processor 304.

The memory 306 can also include one or more device managers 322 for interacting with one or more I/O devices. The device managers 322 can be software installed on the device 100. A device manager 322 can correspond to each I/O device. In addition to the device manager 322, one or more client applications 324 can be loaded into memory 306 and run on or in association with the OS 320. In the present disclosure, a client application 324 can provide the call waiting network identification based on the source a call is coming from. Also within the memory 306, configurations 326 can be run on the device 100 in association with the call waiting network identification client application 324.

In operation, and as will be shown in further details below, the call waiting network identification client application 324 can run with the configurations 326 to determine the calling source and provide a call waiting alert for the incoming source. The alert can be specific to the network. By way of a non-limiting example, two beeps can be provided by the multi-mode device 100 when the source is incoming from the hotel PBX 202 and a vibratory mechanism on the device 100 can be activated when the source is coming from the store PBX 204 shown in FIG. 2. While primarily described as software, the call waiting network identification client application 324 can be run on hardware, software or combination of hardware and software.

The memory 306 can also include a collection of one or more APIs 328 for facilitating wireless communication between the multi-mode device 100 and one or more remote I/O devices. The APIs 328 can be invoked by the call waiting network identification client application 324 for operating between networks. The APIs 328 can be used to recognize and control the one or more remote I/O devices. In this manner, the device 100 is able to take advantage of services or functionalities of the one or more remote I/O devices.

The multi-mode device 100 can also include a power supply 318, which can be implemented as one or more batteries, fuel cells, or other sources of electrical power. The power supply 318 might further include an external power source, such as an AC adapter or a powered docking cradle that supplements or recharges the batteries. The device 100 can include one or more audio, visual and/or vibratory notification mechanisms 312. The mobile device 102 can also include a wireless module 316, such as a Wi-Fi module that facilitates wireless connectivity between the device 100 and the sources.

While a multi-mode device 100 is described throughout the present disclosure, dual-mode devices or the like can also be used. The call waiting network identification client application 324 can be operable with the OS 320. The OS 320 can treat Session Initiation Protocol (SIP) and carriers entirely independent from one another. Typically, previous devices 100 did not provide any form of native call waiting between the two models. In fact there was very little effort undertaken by the OS 320 to co-manage the two phone models, for example, mobile and Voice over IP (VoIP).

The call waiting network identification client application 324 on the multi-mode device 100 can provide a number of features and services that are related to calls, or communications, coming in from the variety of sources. The client application 324 can play a different call waiting tone depending on the network origin of a call, for example, whether the call is coming from a mobile versus VoIP network or between multiple VoIP service providers. The device 100 can also provide context between business and personal calls without interrupting the user and forcing them to take the phone away from their ear to read the caller identification.

When caller identification is not provided, the user can still be aware of the network origin of the call and can make decisions to interrupt the current call or not. When caller identification is provided on one network and not the other, the network specific call waiting indication can serve as a prompt to the user that caller identification is available and can be consulted to determine whether or not to interrupt the call. The multi-mode device 100 can also be used to play standard call waiting tones for both networks to provide a seamless user experience across multiple networks. This can be useful in deployment scenarios like hospitality where the hotel offers VoIP on top the users existing mobile services. Typically, the user of the device 100 does not care which network calls are coming from, but the client can still handle call collisions resulting from multiple service providers.

Referring to FIG. 4, a flow chart depicting illustrative processes for call waiting network identification setup in accordance with one or more aspects of the present disclosure is provided. The processes can begin at block 400. At block 402, the multi-mode device 100 can determine the source or network for which to setup. At block 404, the device 100 can give a priority to the source. This can be optional and in one embodiment, priorities can be based on the importance of network on which a call is received. By way of a non-limiting example, a phone call received off of a personal line can have a lower priority than that of a business line. Alternatively, priorities are not set for the sources.

The multi-mode device 100 can associate the source with a call waiting identification based on its priority at block 406. In one embodiment, the source can be associated with a call waiting identification regardless of its priority. Priorities can be used to determine whether the incoming call can be signaled to the device 100 or disregarded. By way of a non-limiting example, a personal call can be disregarded when the user is on a business call. In one embodiment, the number of beeps or signals provided can be less for a lower priority network while those that have a higher importance can be signaled more frequently. The processes for setting up the call waiting network identification can end at block 408.

FIG. 5 is a table 500 showing possible priorities for network sources in accordance with one or more aspects of the present disclosure. The priorities can be setup for each source and can provide call waiting identifications. In the table 500, a carrier network 502 can have a lower priority then a company network 504 or hotel network 506. If a call were to come in through the carrier network 502 when the user is on the company network 504 that has a higher priority, the call waiting identification could default to voicemail without ever injecting an alert into the original call from the company network 504.

The table 500 can be established and stored within the configurations 326 of the multi-mode device 100. Logic can be included within the client application 324 to differentiate the priorities within the table 500 with the sources and apply appropriate call waiting identifications. In one embodiment, the configurations can provide varying levels of ring tones or vibrations. Those networks having higher priorities can be rung more frequently and those having a lower priority can be sent to voicemail or rung less frequently. Call waiting identifications can also be standardized for each of the sources without regard to priorities.

FIG. 6 is a flow chart depicting illustrative processes for client application activation in accordance with one or more aspects of the present disclosure. While the call waiting network identification client application 324 generally operates continuously, it typically works when the user is on a call with their multi-mode device 100. The processes for activation can begin at block 600. At block 602, the multi-mode device 100 can be placed in a call mode whereby the user can make or receive calls. When the SIP client is involved in a call, it places the native mobile client to "silent ring" mode using the appropriate OS APIs 328 at block 604. This can eliminate the issue where the two phone models operate independently of each other resulting in the phone alerting into the users ear when a mobile call arrives while on the VoIP call. The user can then receive or make a call through a first source at block 606. The processes for client application activation can end at block 608.

After a call is established through a first network, the multi-mode device 100 can provide a network specific call waiting indication when another call is received from a different network. This indication can provide advanced notice to a device 100 and signal which network the call is originating from. The indication can allow the user to decide whether or not to interrupt the ongoing call through the first network or whether or not additional information is available to aid in the decision to interrupt the call.

Turning to FIG. 7, a flow chart depicting illustrative processes for call waiting network identification in accordance with one, or more aspects of the present disclosure is provided. Typically, calls from the same network can be handled by that network. When calls are received from different networks, the following processes can be used to provide a call waiting network identification. The processes can begin at block 700.

At block 702, the multi-mode device 100 can be connected to a first source where communications can go through. Calls can be made or received through the first source. At block 704, a call can be received through a second source. An SIP client application 324 can be designed to be notified of incoming carrier calls using existing APIs 328 provided by the OS 320. Varying networks can provide calls to the device 100. The networks can be independent and separate from each other. By way of a non-limiting example, the carrier network 102 would be independent of the PSTN 106 operating through the PBX 108 of FIG. 1.

The multi-mode device 100 can identify the source of the received call at block 706. Different sources can be used to provide different call waiting identifications. For example, a call received from a company network 504 can have three beeps followed by one second of silence, while the hotel network 506 can have a single beep followed by three seconds of silence. At block 708, the call waiting identification can be injected into the communication of the first source. When injected the beeps would be added onto the call from the first network or laid on top of it. While on a VoIP call with the first source, the SIP client application 324 can be notified of the carrier call by virtue of an OS callback.

At decision block 710, the user of the client application 324 can choose to ignore the call. If ignored, the call from the second source can be disregarded at block 712. This can cause the far end caller to continue to hear a ring back until the carrier moves the call to voicemail. Alternatively; the SIP client 324 can choose to inject a tone into the ongoing VoIP conversation, and/or vibrate, to signal to the user that a carrier call is waiting. The tone played is specific to the carrier, for example, one beep. The device 100 can be configured for carrier calls to trigger vibration. At block 714, caller identification can be provided if supported by the incoming call network. The processes can end at block 716.

For purposes of illustration, when multiple VoIP networks are used, that is a VoIP call is active and another VoIP call arrives, the multi-mode device 100 can inject a different call waiting tone. The network call waiting tones can be configured differently, or to maintain standard based recommendations, the appropriate country tone plan can be followed for carrier calls, and VoIP calls can vibrate (or vice versa). When on a carrier call and a VoIP call arrives, the SIP client application 324 can check the mobile phone state using appropriate OS APIs 328 before emitting audible alerting tones. If the device 100 is active on a mobile call, the applicable VoIP call waiting tone can be injected into the call.

FIG. 8 is a flow chart depicting illustrative processes for call waiting network identification default in accordance with one or more aspects of the present disclosure. The client application which handles the call waiting tone injection can be enhanced to provide additional behaviors related to call routing. For example, while on a business PBX call, the client application 324 can force personal carrier calls to a carrier voicemail. Call waiting can be played when a business call arrives. The model can be adapted to prevent call waiting tones for calls that have no caller identification, for example, carrier calls when the user has not opted to pay for caller identification services or VoIP calls that have call-privacy enabled. The processes can begin at block 800.

At block 802, the multi-mode device 100 can communicate through a first source. A call can be made or received through the first source. At block 804, the device 100 can receive a call through a second source. The second source is independent of the first source, for example, a Wi-Fi source through a PBX and a mobile carrier. At decision block 806, the device 100 can determine whether the second source is a personal carrier to determine whether the incoming call should be sent to voicemail. For purposes of illustration, it can be assumed, for this instance, that a personal carrier has a lower priority as shown in the table 500 of FIG. 5.

If the network is a personal carrier, then the call coming from the personal carrier is sent to voicemail at block 808. Otherwise, a call waiting identification can be injected into the call going through the first source at block 810. A SIP client application 324 can inject a tone into the ongoing VoIP conversation, and/or vibrate, to signal to the user that a carrier call is waiting. The tone played is specified to the carrier or the device 100 can be configured for carrier calls to trigger vibration. When on a carrier call and a VoIP arrives, the SIP client application 324 can check the state of the multi-mode device 100 using appropriate OS APIs 328 before emitting audible alerting, tones. This can remove any interference provided through the injection of the call waiting identification. If available, the device 100 can provide caller identification at block 812. The processes can end at block 814.

The call waiting network identification client application 324, which provided the network identification injection, can be enhanced to provide additional behaviors related to call routing. Call waiting tones for the networks can be standardized. Furthermore, "personal" call waiting tones can be implemented into the application 324, meaning a different tone for each caller can be programmed. In addition, other forms of communications can be handled including texts, videos, etc.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for handling calls on a multi-mode device, the method comprising:
    establishing a table of varying priority levels, the priority levels based on a type of network;
    communicating a call through a first network;
    receiving another call through a second network that is independent of the first network;
    determining a priority level of the received call by referring to the table;
    in response to determining that the received call is a higher priority, than the call through the first network, injecting a call waiting alert into the call through the first network signaling the call through the second network; and
    in response to determining that the received call is a lower priority than the call through the first network, sending the call through the second network to voicemail.

2. The method of claim 1, comprising placing the multi-mode device to a silent ring mode after establishing the call through the first network.

3. The method of claim 2, wherein placing the multi-mode device to the silent ring mode comprises activating Application Programming Interface (APIs) within an operating system of the multi-mode device.

4. The method of claim 1, wherein injecting the alert specific to the second network comprises providing an audible tone into the call through the first network.

5. The method of claim 1, wherein injecting the alert specific to the second network comprises providing a vibration through the multi-mode device.

6. The method of claim 1, wherein the first network is a VoIP network and the second network is a carrier network.

7. The method of claim 6, wherein injecting the alert specific to the carrier network comprises notifying the multi-mode device through an operating system callback.

8. The method of claim 1, wherein the first network is a carrier network and the second network is a Voice over Internet Protocol (VoIP) network.

9. The method of claim 8, wherein injecting the alert specific to the VoIP network comprises checking a state of the multi-mode client before emitting an audible alert.

10. The method of claim 1, wherein injecting the alert specific to the second network comprises providing the alert until the second network transfers the call through the second network to voicemail.

11. The method of claim 1, wherein injecting a call waiting alert into the call through the first network signaling the call through the second network comprises injecting a call waiting alert specific to the second network into the call.

12. A multi-mode device comprising:
    at least one processor; and
    a memory operatively coupled to the processor, the memory storing program instructions that when executed by the processor, causes the processor to:
        store a table of varying priority levels, the priority levels based on a type of network;
        place the multi-mode device in a silent ring mode when the device is currently on a call through a first network;
        receive a call through a second network whilst the multi-mode device is on the call through the first network, the second network being distinct from the first network;
        determine a priority level of the received call by referring to the table;
        respond to determining that the received call is a higher priority than the call through the first network by injecting a call waiting alert into the call through the first network signifying the call through the second network; and
        respond to determining that the received call is a lower priority than the call through the first network by sending the call received through the second network to voicemail.

13. The multi-mode device of claim 12, wherein the call waiting alert is an audible or vibratory notification.

14. The multi-mode device of claim 13, wherein the call waiting alert changes with different networks.

15. The multi-mode device of claim 12, wherein adding the call waiting alert comprises determining whether the second network is business or personal.

16. The multi-mode device of claim 12, wherein the call waiting alert notifies the availability of caller identification.

17. The multi-mode device of claim 12, wherein each network of the at least two networks comprise at least one of a cellular wireless network, private cellular network, wireless network and Near Field Communications (NFC) network.

18. The multi-mode device of claim 12, wherein the priority level of the received call is low priority when the second network is personal.

19. The multi-mode device of claim 12, wherein the priority level of the received call is high priority when the second network is a private network.

20. The multi-mode device of claim 12, wherein injecting a call waiting alert into the call through the first network signaling the call through the second network comprises injecting a call waiting alert specific to the second network into the call.

\* \* \* \* \*